United States Patent
Miyagi

(10) Patent No.: US 8,169,412 B2
(45) Date of Patent: May 1, 2012

(54) DISPLAY APPARATUS AND DISPLAY METHOD CAPABLE OF ADJUSTING POSITION OF IMAGE ASSOCIATED WITH APPLICATION PROGRAM BY SPECIFYING COMMANDS INDICATIVE OF SCREEN SIZE AND DISPLAY POSITION

(75) Inventor: Daisuke Miyagi, Aichi (JP)

(73) Assignee: Sharp Kabushiki Kaisha, Osaka (JP)

( * ) Notice: Subject to any disclaimer, the term of this patent is extended or adjusted under 35 U.S.C. 154(b) by 944 days.

(21) Appl. No.: 12/182,817

(22) Filed: Jul. 30, 2008

(65) Prior Publication Data

US 2009/0033616 A1 Feb. 5, 2009

(30) Foreign Application Priority Data

Aug. 1, 2007 (JP) ................ P2007-201249

(51) Int. Cl.
*G06F 3/041* (2006.01)
*G06F 3/048* (2006.01)
(52) U.S. Cl. ...................... 345/173; 715/788
(58) Field of Classification Search .......... 345/173–178; 715/781, 788, 799
See application file for complete search history.

(56) References Cited

U.S. PATENT DOCUMENTS

| 5,748,926 A | 5/1998 | Fukuda et al. |
| 2005/0259087 A1 | 11/2005 | Hoshino et al. |
| 2007/0124694 A1* | 5/2007 | Van De Sluis et al. ....... 715/775 |
| 2007/0180400 A1* | 8/2007 | Zotov et al. .................... 715/788 |

FOREIGN PATENT DOCUMENTS

| JP | 6-250779 A | 9/1994 |
| JP | 8-286807 A | 11/1996 |
| JP | 2000-123114 A | 4/2000 |
| JP | 2001-147762 A | 5/2001 |
| JP | 2002-259001 A | 9/2002 |
| JP | 2004-272835 A | 9/2004 |

* cited by examiner

Primary Examiner — Bipin Shalwala
Assistant Examiner — Steven Holton
(74) Attorney, Agent, or Firm — Birch, Stewart, Kolasch & Birch, LLP

(57) ABSTRACT

A display apparatus and a display method are provided capable of displaying an image in a desirably adjusted state upon execution of an application program. In the display apparatus, a command for display position is inputted to the touch panel and according to such an input, a determining section determines an application program, and display adjusting section adjusts a display position of an image appearing upon execution of the application program so that the image appears at a desired display position on a liquid crystal panel.

12 Claims, 12 Drawing Sheets

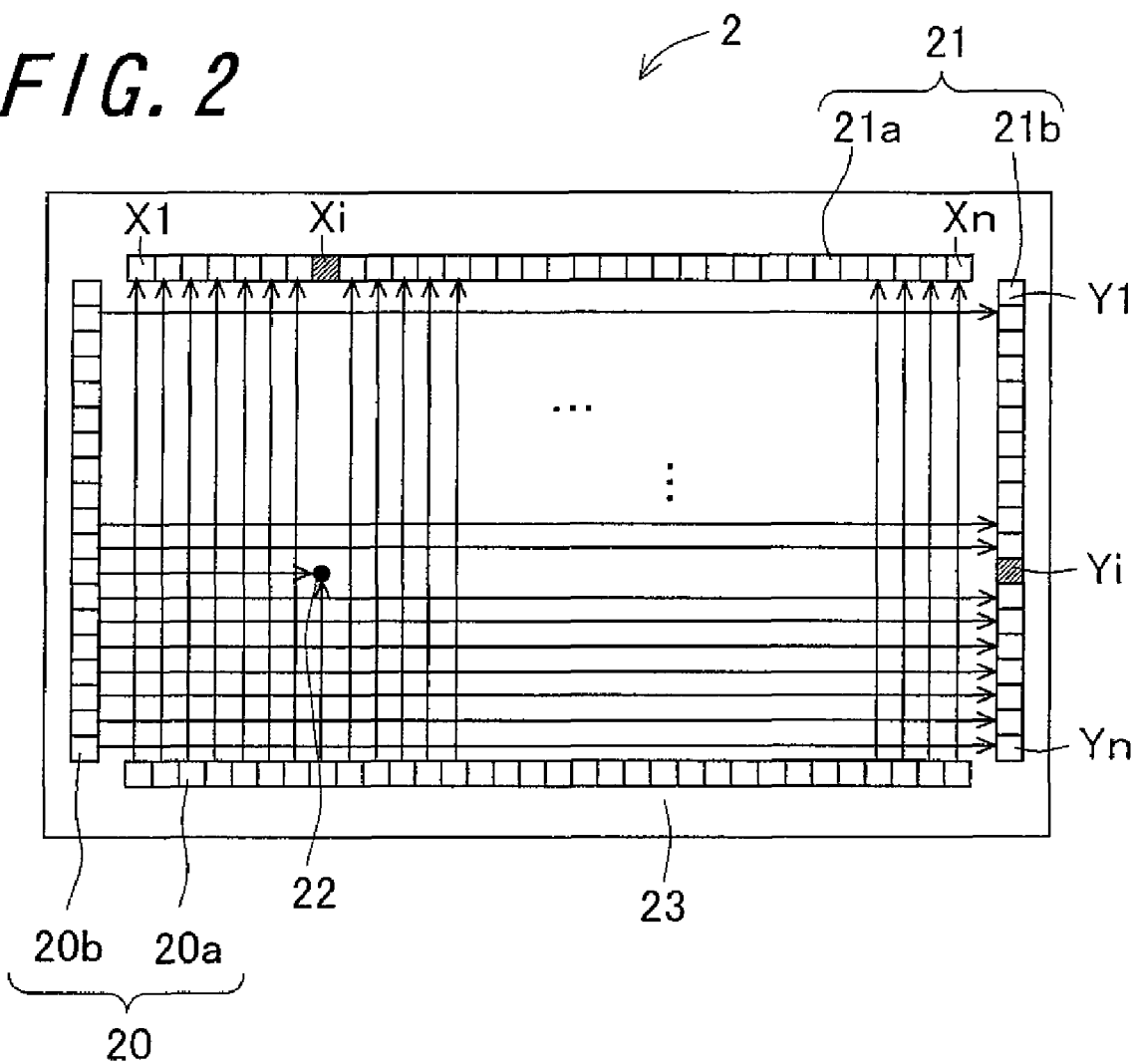

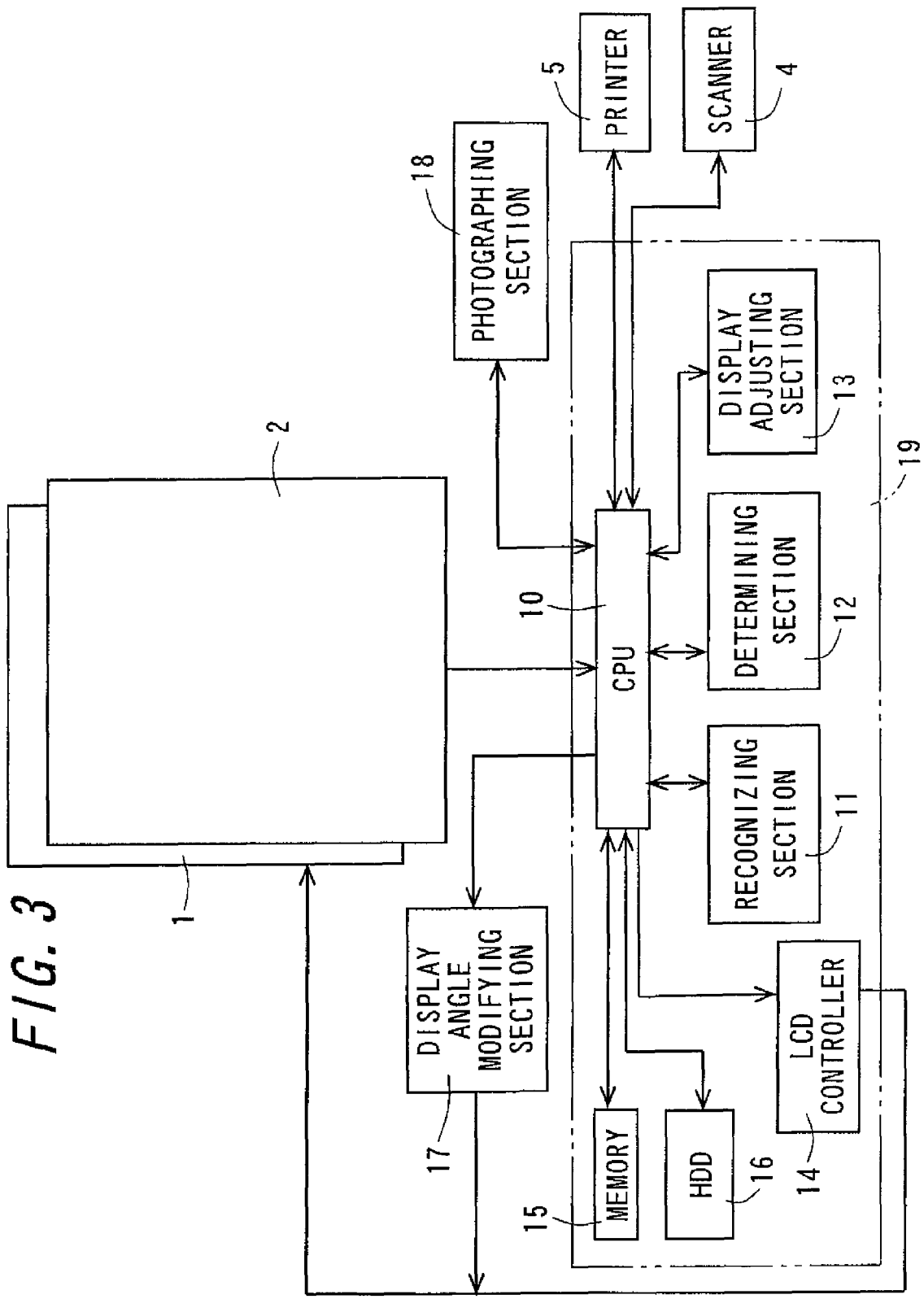

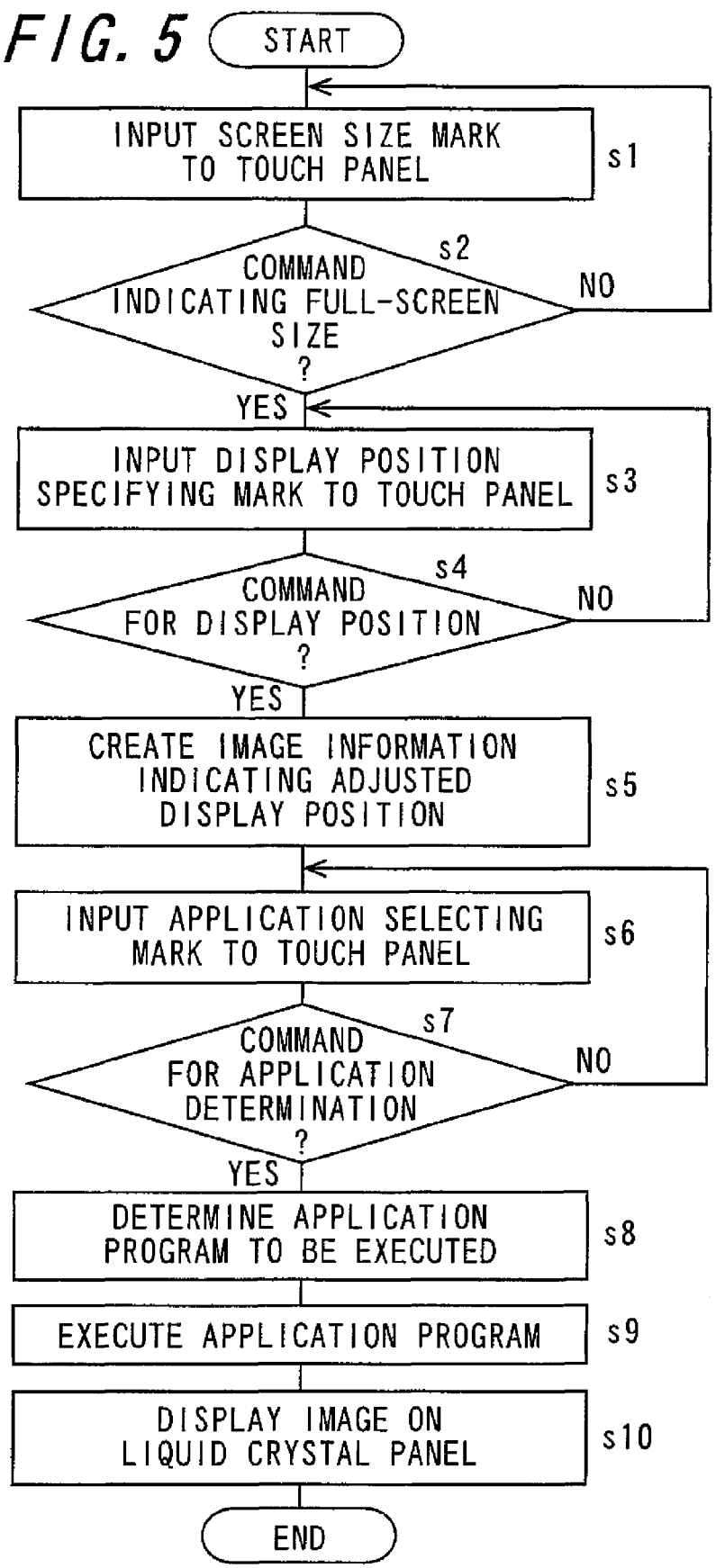

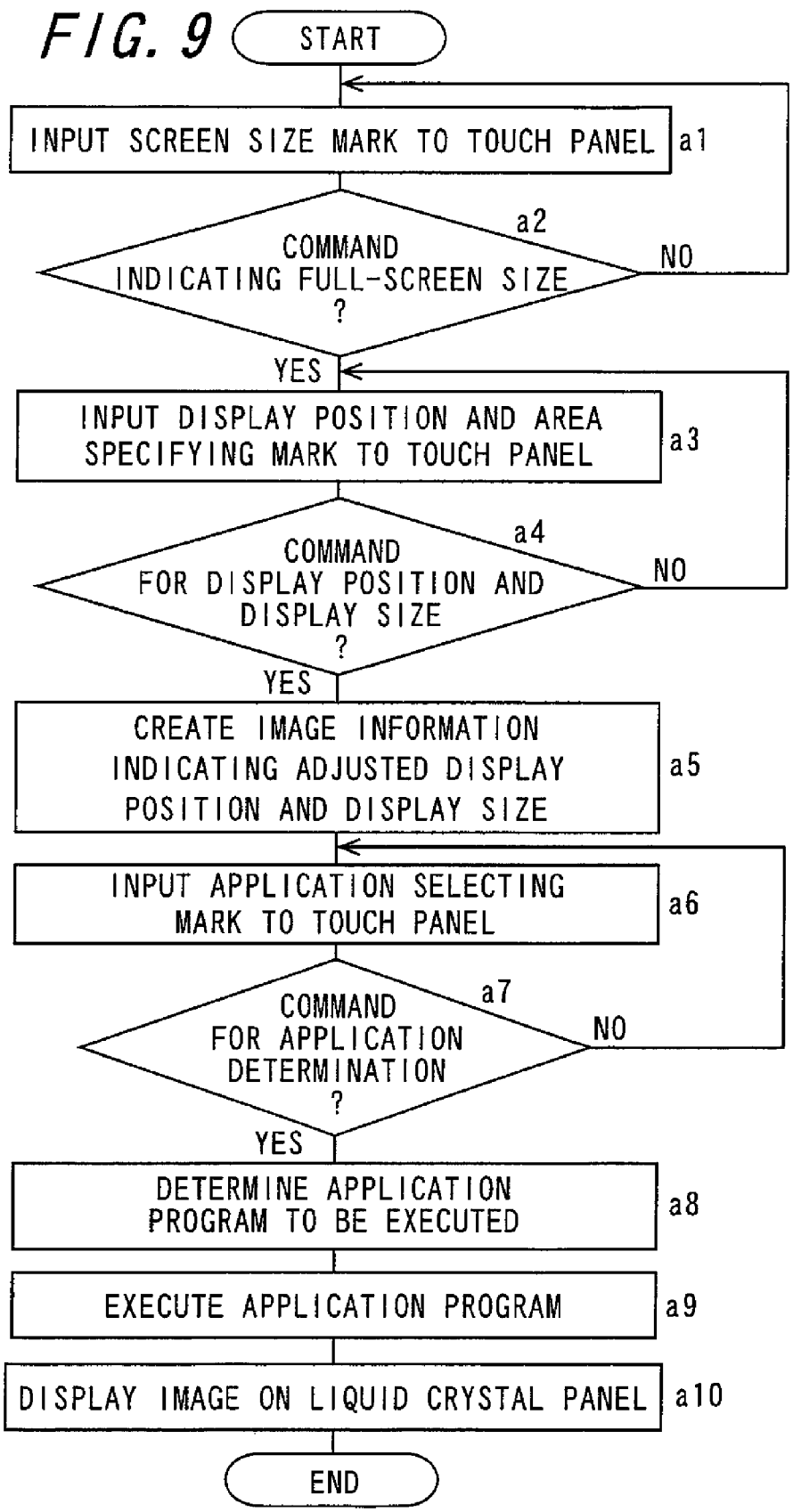

DISPLAY APPARATUS AND DISPLAY METHOD CAPABLE OF ADJUSTING POSITION OF IMAGE ASSOCIATED WITH APPLICATION PROGRAM BY SPECIFYING COMMANDS INDICATIVE OF SCREEN SIZE AND DISPLAY POSITION

CROSS-REFERENCE TO RELATED APPLICATION

This application claims priority to Japanese Patent Application No. 2007-201249, which was filed on Aug. 1, 2007, the contents of which are incorporated herein by reference in its entirety.

BACKGROUND OF THE INVENTION

1. Field of the Invention

The present invention relates to a display apparatus and display method of displaying an image by execution of an application program.

2. Description of the Related Art

Liquid crystal display devices are capable of displaying clear images even in lighted environments and have therefore been widely used on presentations, etc., instead of projectors which display images by casting reflections on screens. Especially the liquid crystal display devices used for presentations have been increasing in size with such large display screens as to around 64 to 100 inches where images appear in liquid crystal panels. A presenter makes a presentation, looking at images displayed in a liquid crystal display device having such a large liquid crystal panel. In controlling an icon located on the liquid crystal panel, the presenter sometimes has to look for the icon on the vast liquid crystal panel and needs to move oneself to control the icon. The controllability has thus been not good.

For solving the problem just mentioned, some techniques are disclosed in Japanese Unexamined Patent Publications JP-A 8-286807 (1996) and JP-A 2000-123114, for example, that such a simple operation as inputting a command to a touch panel allows a control on a menu window or the like element. In JP-A 8-286807, gestures are recognized according to such measurements as how many times a stylus has touched a digitizer which detects a stylus touching position, how many times the stylus has made halts after touching the digitizer, how many time the stylus touching the digitizer has moved, and how many times the stylus has made halts after being moved. This allows for discriminatory recognition between the gestures and the other characters and figures. By using the gestures thus recognized, operation like editing a text is enabled in a simple way.

In JP-A 2000-123114, a recognition window appears according to a handwritten character inputted at a given position on a touch panel. This recognition window shows a character recognition result of the inputted handwritten character, and on the recognition window, the recognition result is modified and the kana-kanji conversion is carried out with reference to a character string of the recognition result. The recognition result and the conversion character string candidate can be therefore fixed or cancelled by the handwriting input. By using the recognition window, operation of displaying a menu window, etc., is enabled.

The techniques disclosed in JP-A 8-286807 and JP-A 2000-123114, however, do not enable images to appear in desired display sizes or at desired display positions when the images are displayed upon execution of application programs. In display devices, display screens are controlled by, for example, an operating system called "WINDOWS" (registered trademark) created by Microsoft Corporation, and therefore the display sizes and display positions have been stored of the last images displayed through the execution of the application programs before shutdowns thereof. Upon the following execution of the application programs, this renders new images unable to appear in desired display sizes or at desired display positions.

SUMMARY OF THE INVENTION

An object of the invention is to provide a display apparatus and display method capable of displaying an image in a desirably adjusted state by execution of an application program.

The invention provides a display apparatus comprising:

a storage section for storing application programs;

a display section for displaying an image;

a touch panel for inputting a command for setting of the image to be displayed on the display section;

a recognizing section for detecting the command inputted to the touch panel and recognizing a content of the command based on a detected result;

a determining section for determining an application program to be executed among the application programs stored in the storage section based on the content of the command recognized by the recognizing section;

a display adjusting section for creating image information by adjusting the setting of the image to be displayed on the display section based on the content of the command recognized by the recognizing section; and a display controlling section for supplying to the display section the image information created by the display adjusting section, and displaying the image on the display section, upon execution of the application program determined by the determining section, the image associated with the application program determined appearing at a display position on the display section based on adjustment of the display adjusting section.

According to the invention, a command for image display position on a display section is inputted to a touch panel, and this command input activates a recognizing section to recognize an application program to be executed among application programs stored in a storage section, and a display adjusting section to create image information by adjusting setting of the image to be displayed on the display section. And a display controlling section supplies the image information created by the display adjusting section to the display section on which the image then appears. The image can be thus displayed at the desired display position indicated by the input to the touch panel upon execution of the application program.

Further, in the invention, it is preferable that the display adjusting section adjusts the display position of the image on the display section according to a predetermined display position specifying mark indicative of desired display position inputted to the touch panel.

According to the invention, input of a predetermined display position specifying mark to the touch panel activates the display adjusting section to adjust the display position of the image on the display section. The command for display position can be thus distinguished from other commands, allowing for the display adjusting section to reliably adjust the display position of the image on the display section based on the command inputted to the touch panel.

The invention provides a display apparatus comprising:
a storage section for storing application programs;
a display section for displaying an image;
a touch panel for inputting a command for setting of the image to be displayed on the display section;
a recognizing section for detecting the command inputted to the touch panel and recognizing a content of the command based on a detected result;
a determining section for determining an application program to be executed among the application programs stored in the storage section based on the content of the command recognized by the recognizing section;
a display adjusting section for creating image information by adjusting the setting of the image to be displayed on the display section based on the content of the command recognized by the recognizing section; and
a display controlling section for supplying to the display section the image information created by the display adjusting section, and displaying the image on the displaying section,
upon execution of the application program determined by the determining section, the image associated with the application program determined appearing at a display position and in a display size on the display section based on adjustment of the display adjusting section.

According to the invention, a command for image display position and image display size on a display section is inputted to a touch panel, and this command input activates a recognizing section to recognize an application program to be executed among application programs stored in a storage section, and a display adjusting section to create image information by adjusting setting of the image to be displayed on the display section. And a display controlling section supplies the image information created by the display adjusting section to the display section on which the image then appears. The image can be thus displayed at the desired display position and in the desired display size indicated by the input to the touch panel upon execution of the application program.

Further, in the invention, it is preferable that the display adjusting section adjusts the display position and display size of the image on the display section according to a predetermined display position and area specifying mark indicative of desired display position and display size inputted to the touch panel.

According to the invention, input of a predetermined display position and area specifying mark to the touch panel activates the display adjusting section to adjust the display position and display size of the image on the display section. The command for display position and display size can be thus distinguished from other commands, allowing for the display adjusting section to reliably adjust the display position and display size of the image on the display section based on the command inputted to the touch panel.

Further, in the invention, it is preferable that the determining section determines the application program to be executed according to an application selecting mark indicative of application selection inputted to the touch panel, the mark corresponding to each application program stored in the storage section.

According to the invention, the determining section determines the application program to be executed according to application selecting marks inputted to the touch panel, which marks are different from each other and correspond to the application programs stored in the storage section. This makes it possible to prevent an application from being selected based on a false recognition even in the case where a plurality of the application programs are to be executed.

Further, in the invention, it is preferable that the determining section determines the application program to be executed and the display adjusting section adjusts the display position of the image on the display section, according to a predetermined mark indicative of desired display position and application selection inputted to the touch panel.

According to the invention, the determining section determines the application program to be executed and the display adjusting section adjusts the display position of the image on the display section, according to a predetermined mark indicative of desired display position and application selection inputted to the touch panel. One mark input thus allows the instructions on both selections of application program and display position, resulting in simpler operations.

Further, in the invention, it is preferable that the display adjusting section adjusts and specifies the display position of the image on the display section and then the determining section determines the application program to be executed, according to a predetermined mark indicative of desired display position and application selection inputted to the touch panel.

According to the invention, the display adjusting section adjusts and specifies the display position of the image on the display section and then the determining section determines the application program to be executed, according to a predetermined mark indicative of desired display position and application selection inputted to the touch panel. Upon execution of the application program, the image can be therefore displayed at the desired display position unfailingly as compared to the case where the application program is determined and specified and then the display position of the image is adjusted and specified.

Further, in the invention, it is preferable that the determining section determines the application program to be executed and the display adjusting section adjusts the display position and display size of the image on the display section, according to a predetermined mark indicative of desired display position, display size, and application selection inputted to the touch panel.

According to the invention, the determining section determines the application program to be executed and furthermore the display adjusting section adjusts the display position and display size of the image on the display section, according to a predetermined mark indicative of desired display position, display size, and application selection inputted to the touch panel. One mark input thus allows the instructions on selections of all the display position, display size, and the application program, resulting in simpler operations.

Further, in the invention, it is preferable that the display adjusting section adjusts and specifies the display position and display size of the image on the display section and then the determining section determines the application program to be executed, according to a predetermined mark indicative of desired display position, display size, and application selection inputted to the touch panel.

According to the invention, the display adjusting section adjusts and specifies the display position and display size of the image on the display section and then the determining section determines the application program to be executed, according to a predetermined mark indicative of desired display position, display size, and application selection inputted to the touch panel. Upon execution of the application program, the image can be therefore displayed at the desired display position and in the desired display size unfailingly as compared to the case where the application program is determined and specified and then the display position and display size of the image are adjusted and specified.

The invention provides a display method comprising:

a command input step of inputting a command for setting of an image to be displayed on a display apparatus;

a recognizing step of detecting the command inputted in the command input step and recognizing a content of the command based on a detected result;

a display adjusting step of creating image information by adjusting the setting of the image to be displayed on the display apparatus based on the content of the command recognized in the recognizing step;

a determining step of determining an application program to be executed based on the content of the command recognized in the recognizing step; and a displaying step of detecting the image information created in the display adjusting step and displaying the image on the display apparatus, upon execution of the application program determined in the determining step, the image associated with the application program determined appearing at a display position based on adjustment in the display adjusting step.

According to the invention, in a command input step, inputted is a command for setting of an image to be displayed on a display apparatus. Next, in a recognizing step, the command inputted in the command input step is detected and on the basis of a detected result, a content of the command is recognized. Next, in a display adjusting step, image information is created based on the content of the command recognized in the recognizing step, to adjust the display position of the image to be displayed on the display apparatus. Next, in a determining section, an application program to be executed is determined based on the content of the command recognized in the recognizing step. And in a displaying section, the image information created in the display adjusting step is detected to display the image on the display apparatus. The image can be thus displayed at the desired display position inputted in the command input step upon execution of the application program.

The invention provides a display method comprising:

a command input step of inputting a command for setting of an image to be displayed on a display apparatus;

a recognizing step of detecting the command inputted in the command input step and recognizing a content of the command based on a detected result;

a display adjusting step of creating image information by adjusting the setting of the image to be displayed on the display apparatus based on the content of the command recognized in the recognizing step;

a determining step of determining an application program to be executed based on the content of the command recognized in the recognizing step; and a displaying step of detecting the image information created in the display adjusting step and displaying the image on the display apparatus, upon execution of the application program determined in the determining step, the image associated with the application program determined appearing at a display position and in a display size based on adjustment in the display adjusting step.

According to the invention, in a command input step, inputted is a command for setting of an image to be displayed on a display apparatus. Next, in a recognizing step, the command inputted in the command input step is detected and on the basis of a detected result thereof, a content of the command is recognized. Next, in a display adjusting step, image information is created based on the content of the command recognized in the recognizing step, to adjust the display position and display size of the image to be displayed on the display apparatus. Next, in a determining section, an application program to be executed is determined based on the content of the command recognized in the recognizing step. And in a displaying section, the image information created in the display adjusting step is detected to display the image on the display apparatus. The image can be thus displayed at the desired display position and in the desired display size inputted in the command input step upon execution of the application program.

BRIEF DESCRIPTION OF THE DRAWINGS

Other and further objects, features, and advantages of the invention will be more explicit from the following detailed description taken with reference to the drawings wherein:

FIG. 2 is a view showing a configuration of a touch panel;

FIG. 3 is a block diagram showing an electrical configuration of the display apparatus;

FIG. 5 is a flowchart showing the display method according to the first embodiment of the invention;

FIG. 9 is a flowchart showing the display method according to the third embodiment of the intention.

DETAILED DESCRIPTION OF THE INVENTION

Figure 1:
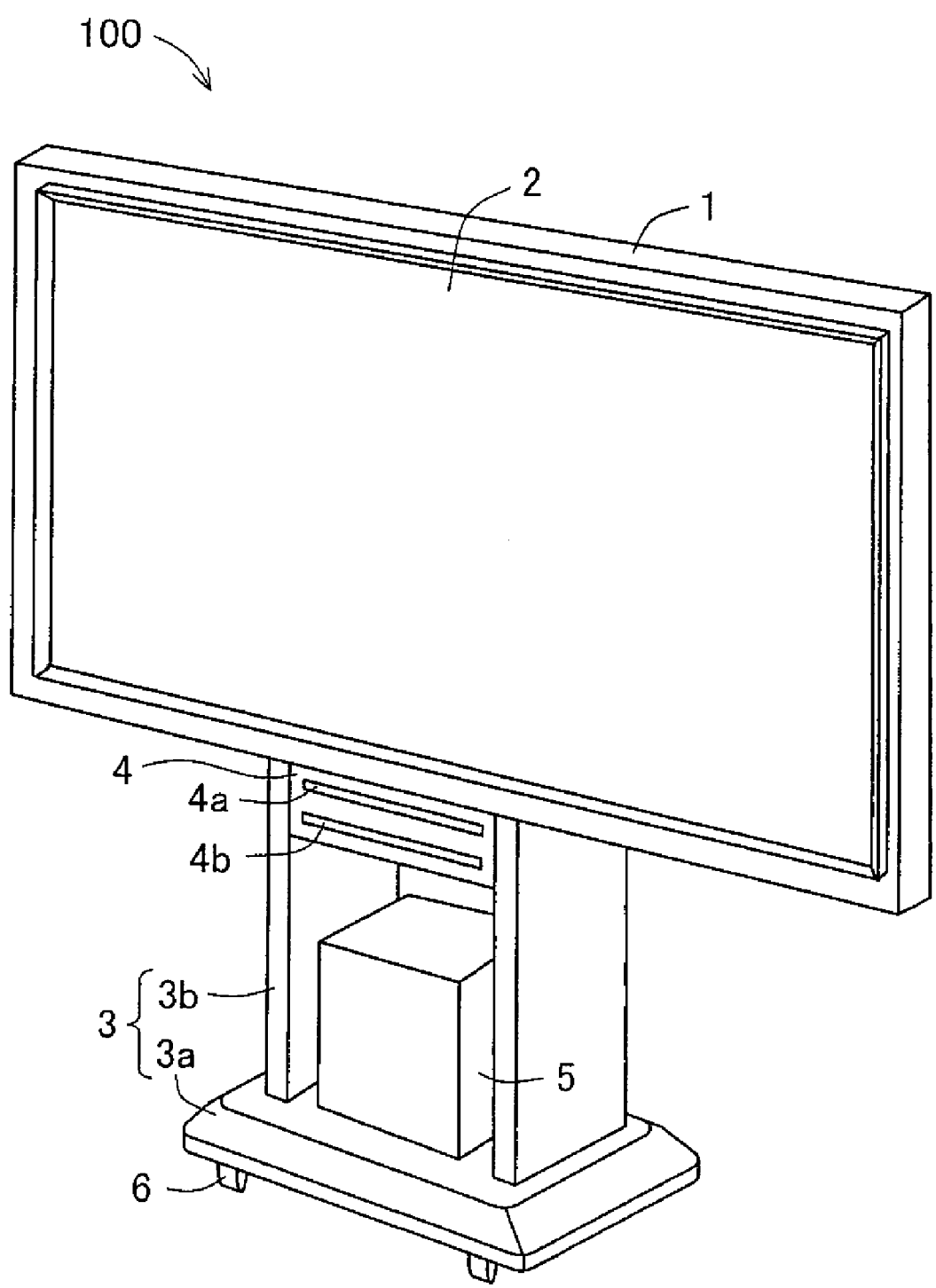
FIG. 1 is a perspective view showing a configuration of a display apparatus.

Now referring to the drawings, embodiments of the invention are described below.

FIG. 1 is a perspective view showing a configuration of a display apparatus 100. FIG. 2 is a view showing a configuration of a touch panel 2.

The display apparatus 100 is a device using a window display function provided as a basic performance in an operating system for personal computer, represented by "WINDOWS" (registered trademark) created by Microsoft Corporation, to display a window screen upon execution of an application program. Specific examples of the display apparatus include flat panel displays (abbreviated as FPD) such as a liquid crystal display (abbreviated as LCD), a plasma display panel (abbreviated as PDP), and a surface conduction electron emitter display (abbreviated as SED). The display apparatus 100 according to one embodiment of the invention is in form of LCD.

The display apparatus 100 includes a liquid crystal panel 1, a touch panel 2, and a display image control unit (not shown).

The liquid crystal panel 1 is formed in a rectangular plate and is formed of a liquid crystal cell comprising glass substrates on which a thin-film transistor circuit and a color filter are formed and a liquid crystal material sandwiched between the glass substrates hermetically. The liquid crystal panel 1 serves as a display section having a display screen on which an image is displayed. In the present embodiment, the liquid crystal panel 1 has such a large-sized display screen as 64 to 100 inches.

The liquid crystal panel 1 is reinforced with its periphery covered by a frame member to which a pedestal 3 is connected to support the liquid crystal panel 1 so as to be disposed on a floor. The pedestal 3 is composed of a base 3a and two leg portions 3b. The leg portions 3b are connected to the frame member covering the periphery of the liquid crystal panel 1 and extend vertically downward to the base 3a which is connected to the floor. The base 3a is provided with casters 6 so that the display apparatus 100 can move freely.

The display apparatus 100 is further equipped with a scanner 4 and a printer 5 which are peripherals. The scanner 4 is installed between the two leg portions 3b, and the printer 5 is installed on a top surface of the base 3a. The scanner 4 is a device which operates to read an image on a document inserted from an inlet 4a until the document is discharged from an outlet 4b. The printer 5 is a device printing an image, etc., displayed on the liquid crystal panel 1. The display apparatus 100 furthermore has a stylus (not shown) and a mouse (not shown) which are operation members to input a command to the touch panel 2.

The touch panel 2 is a member inputting a command for setting of an image to be displayed on the liquid crystal panel 1. The command is inputted by using a tip of the operation member, i.e., the stylus, to press or take notes on the touch panel 2. The touch panel 2 includes a clear light transmitting member 23 made of glass or the like material having a rectangle shape, and is formed integrally with the liquid crystal panel 1 so as to cover the display screen of the liquid crystal panel 1.

On a surface of the light transmitting member 23 provided in the touch panel 2, LED (light emitting diode) arrays 20 and phototransistor arrays 21 for detecting a press position of the stylus are installed inside of four peripheral sides of the light transmitting member 23 as shown in FIG. 2. The LED arrays 20 include an X-direction LED array 20a corresponding to one of long sides of the light transmitting member 23 and a Y-direction LED array 20b corresponding to one of short sides of the light transmitting member 23. The phototransistor arrays 21 include an X-direction phototransistor array 21a corresponding to the other long side of the light transmitting member 23 and a Y-direction phototransistor array 21b corresponding to the other short side of the light transmitting member 23. A interval between adjacent LEDs constituting the LED array or between adjacent phototransistors constituting the phototransistor array is set at 0.5 mm.

Next, a method will be explained of displaying characters on the touch panel 2 when the command is inputted by operating the stylus to press and take notes on the touch panel 2. The tip of the stylus makes contact with the surface of the light transmitting member 23 and thereby blocks off the light being emitted from LEDs of the LED arrays 20 and passing through a contact position of the stylus, with the result that phototransistors of the phototransistor arrays 21 located face-to-face with the LEDs of the LED arrays 20 receives no light. And a position of the phototransistors of the phototransistor arrays 21 receiving no light from the LEDs of the LED arrays 20 is recognized in coordinates as a designated coordinate value ($X_i$, $Y_i$), and this coordinate information is outputted to an information processing section (not shown). The information processing section displays a predetermined object at a detected position in coordinates. The object is, for example, a dot image. By moving the stylus on the surface of the light transmitting member 23, dot-image objects can be consecutively displayed so that desired figures and characters can be drawn. The objects may include predetermined standard figures such as a straight line, a circle, a triangle, and a square.

FIG. 3 is a block diagram showing an electrical configuration of the display apparatus 100. The display apparatus 100 has not only the above-stated liquid crystal panel 1 and touch panel 2 but also a display image control unit 19. The display image control unit 19 adjusts setting of an image to be displayed on the liquid crystal panel 1 based on the command inputted to the touch panel 2. The display image control unit 19 includes a recognizing section 11, a determining section 12, a display adjusting section 13, an LCD controller 14 serving as a display controlling section, and a memory 15 and HDD (hard disk drive) 16 serving as storage sections. In these sections, overall control thereof is carried out by a CPU (central processing unit) 10 having a computing circuit.

The HDD 16 stores application programs such as word-processing software "MICROSOFT WORD" (registered trademark) created by Microsoft Corporation and spreadsheet software "MICROSOFT EXCEL" (registered trademark) created by Microsoft Corporation, and an operating system "WINDOWS" (registered trademark) created by Microsoft Corporation. The memory 15 stores shape data of predetermined marks such as a screen size mark indicative of full-screen size of the liquid crystal panel 1, an application selecting mark indicative of application selection, a display position specifying mark indicative of a display position, and a display position and area specifying mark indicative of a display position and a display size.

The screen size mark is not particularly limited as long as it is not mixed up with other marks. Examples of the screen size mark may include a pair of hook-shaped brackets diagonally arranged. In the memory 15, the application selecting marks are stored respectively in association with corresponding application programs stored in the HDD 16. The application selecting mark is not particularly limited as long as it is not mixed up with other marks. Examples of the application selecting mark may include character marks such as extensions of the application programs and application names. And icons indicative of application programs arranged on the desktop can also be used as the application selecting marks. The display position specifying mark is not particularly limited as long as it is not mixed up with other marks. Examples of the display position specifying mark may include standard figures such as a cross (x), a circle (○), a triangle (Δ), and a square (□).

The display position and area specifying mark is not particularly limited as long as it is not mixed up with other marks. Examples of the display position and area specifying mark may include standard figures such as a cross (x), a circle (○), a triangle (Δ), and a square (□). As to the display position and area specifying mark, a size of the mark itself serves as information indicative of the display size. That is to say, the display size is adjusted to a proportion of the display position and area specifying mark in the area specified by the screen size mark, for example. The display size may also be adjusted to a predetermined proportion in accordance with the size of the display position and area specifying mark, for example.

The CPU 10 determines that a shift to a command input mode is instructed, for example, on ground that a specific figure is inputted to the touch panel 2 and that a tag indicative of the shift to the command input mode is selected in menu. In the command input mode thus set, the CPU 10 receives a command signal of the command inputted to the touch panel 2 and sends the command signal to the recognizing section 11. The recognizing section 11 detects the command inputted to the touch panel 2 based on the command signal sent from the CPU 10, and uses its detected result to recognize a content of the command through comparison with predetermined shape data stored in the memory 15, thereafter sending its recognized result to the CPU 10. The determining section 12 receives a command sent from the CPU 10 to determine an application program based on the recognized result made by the recognizing section 11 and thereby specifies the application program to be executed among the application programs stored in the MUD 16, thereafter sending its determined result to the CPU 10.

The display adjusting section 13 receives a command sent from the CPU 10 to adjust setting of an image based on the recognized result made by the recognizing section 11 and thereby adjusts the setting of the image to be displayed on the liquid crystal panel 1 to create image information, thereafter sending the image information to the CPU 10. The CPU 10 sends to the LCD controller 14 signals of the determined result sent from the determining section 12 and the image information sent from the display adjusting section 13. The LCD controller 14 supplies the liquid crystal panel 1 with the signals of the determined result and image information sent from the CPU 10, and thereby displays an image on the liquid crystal panel 1. As just described, the display image control unit 19 adjusts the setting of the image to be displayed on the crystal liquid panel 1 based on the command inputted to the touch panel 2, and thereafter displays the image on the crystal liquid panel 1.

To the CPU 10 are connected the scanner 4, the printer 5, a display angle modifying section 17, and a photographing section 1. The scanner 4 receives an image-read command sent from the CPU 10 and reads the image in the document according to the command. The printer 5 receives a print command sent from the CPU 10 and prints out the image displayed on the liquid crystal panel 1 according to the command. The display angle modifying section 17 is an element used to modify an orientation of the display screen of the liquid crystal panel 1, and thus modifies the orientation of the display screen according to an angle-modification command sent from the CPU 10. The photographing section 18 is an element represented by a digital video camera, having a function of taking a moving image and a still image, and receives a photographing command sent from the CPU 10 and takes the moving image and the still image according to the command.

FIGS. 4A to 4E are views illustrating a display method according to a first embodiment of the invention, of displaying an image at a designated display position upon execution of an application program in the display apparatus. FIG. 5 is a flowchart showing the display method according to the first embodiment of the invention. In the display method according to the first embodiment, an operation for displaying an image at a desired display position is initiated when an application program is executed with the display apparatus 100 controlled by the operating system "WINDOWS" (registered trademark). In this case, icons corresponding to the application programs stored in the HDD 16 are arranged on the desktop as the application selecting marks. The memory 15 stores shape data of a pair of hook-shaped brackets diagonally arranged as a mark indicative of the full-screen size of the liquid crystal panel 1, and a cross (x) and a circle (○) as display position specifying marks.

Figure 4A:
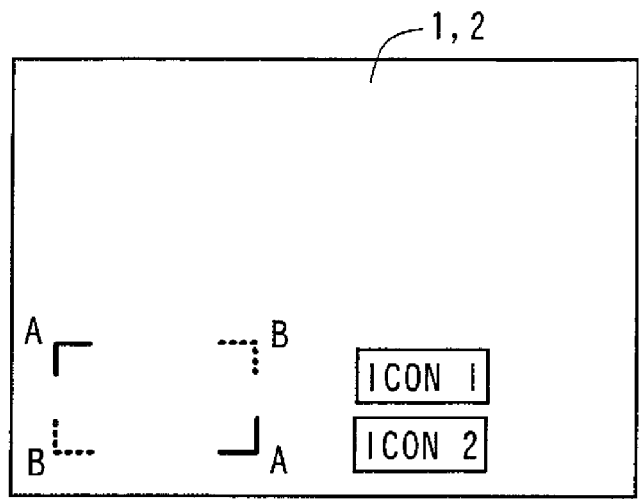
FIGS. 4A to 4E, are views illustrating a display method according to a first embodiment of the invention, of displaying an image at a designated display position upon execution of an application program in the display apparatus.
Figure 4B:
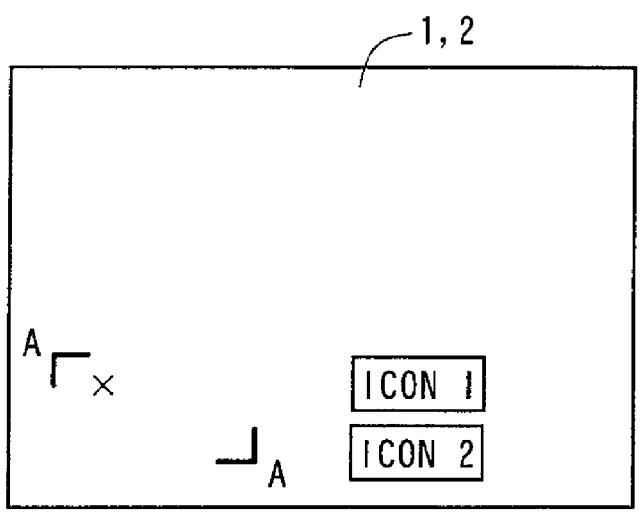

First of all, in Step s1, hook-shaped brackets A predetermined as a screen size mark are handwritten with use of the stylus and thus inputted to the touch panel 2 as shown in FIG. 4A. After completion of the handwriting input, an entry button (not shown) located on the touch panel 2 is pressed with use of the stylus to fix the command. This transmits the command signal from the touch panel 2 to the CPU 10, and the CPU 10 sends the command signal received from the touch panel 2 to the recognizing section 11.

Next, in Step s2, the recognizing section 11 detects the command signal sent from the CPU 10 and recognizes the content of the command through comparison with the shape data stored in the memory 15. In the case where the recognizing section 11 recognizes that the command has a content indicative of the full-screen size represented by the full-screen size mark, the recognizing section 11 sends the recognized result to the CPU 10. The procedure thus proceeds to Step s3. In the case where the recognizing section 11 fails to recognize the content of the command, a guidance window appears such as "PLEASE REENTER COMMAND" or the like message to encourage reentry of the command. When such a guidance window appears, Step s1 will be repeated. In this case, the handwriting input of the screen-size mark, i.e., the hook-shaped brackets A and B, to the touch panel 2 with use of the stylus makes it easy for the recognizing section 11 to recognize that the command indicates the full-screen size.

Next, in Step s3, a cross (x) which is predetermined as the display position specifying mark is handwritten with use of the stylus and thus inputted within an area enclosed by the hook-shaped brackets A on the touch panel 2 as shown in FIG. 43. After completion of the handwriting input, the entry button is pressed with use of the stylus. This transmits the command signal from the touch panel 2 to the CPU 10, and the CPU 10 sends the command signal received from the touch panel 2 to the recognizing section 11. Next, in Step s4, the recognizing section 11 detects the command signal sent from the CPU 10 and recognizes the content of the command through comparison with the shape data stored in the memory 15. In the case where the recognizing section 11 recognizes that the command has a content indicative of the display position represented by the display position specifying mark, the recognizing section 11 sends the recognized result to the CPU 10. The procedure thus proceeds to Step s5. In the case where the recognizing section 11 fails to recognize the content of the command, a guidance window appears such as "PLEASE REENTER COMMAND" or the like message to encourage reentry of the command. When such a guidance window appears, Step s3 will be repeated.

Next, in Step s5, the display adjusting section 13 receives a command from the CPU 10 to adjust the display position based on the recognized result made by the recognizing section 11, and thus creates the image information including the display position adjusted of the image to be displayed upon execution of the application program, thereafter sending the image information to the CPU 10. As described above, the display adjusting section 13 adjusts the display position of the image when the predetermined display position specifying mark, i.e., the cross (x), in inputted to the touch panel 2. The command for the display position can be therefore distinguished from other commands, allowing for the display adjusting section 13 to reliably adjust the display position of the image based on the command inputted to the touch panel 2.

Figure 4C:
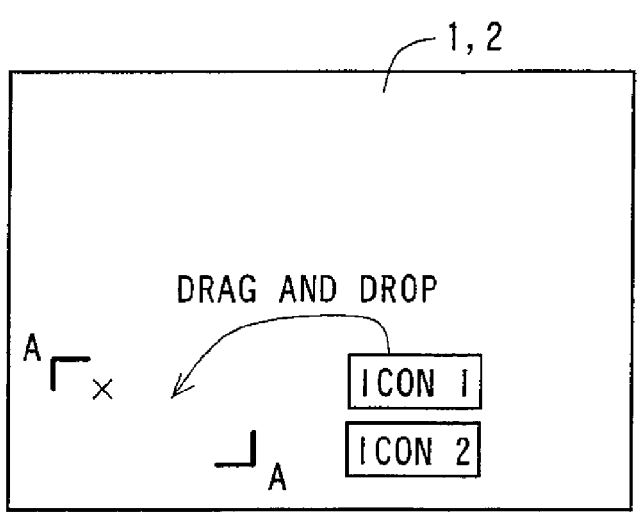

Next, in Step s6, an icon which is the application selecting mark located on the desktop is dragged and dropped within the area enclosed by the hook-shaped brackets A on the touch panel 2 by use of the operation member, i.e., the mouse, connected to the display apparatus 100, as shown in FIG. 4C. The drop causes the command signal to be sent to the CPU 10, and the CPU 10 sends the command signal to the recognizing section 11. Next, in Step s7, the recognizing section 11 detects the command signal sent from the CPU 10 and recognizes the content of the command through comparison with the shape data stored in the memory 15. In the case where the recognizing section 11 recognizes that the command has a content indicative of the application determination represented by the application selecting mark, the recognizing section 11 sends the recognized result to the CPU 10. The procedure thus proceeds to Step s8. In the case where the recognizing section 11 fails to recognize the content of the command, a guidance window appears such as "PLEASE REENTER COMMAND" or the like message to encourage reentry of the command. When such a guidance window appears, Step 36 will be repeated.

Next, in Step s8, the determining section 12 receives the command sent from the CPU 10 to determine an application program based on the recognized result made by the recognizing section 11 and thereby specifies the application program to be executed, thereafter sending its determined result to the CPU 10. As described above, the application program to be executed and the display position are specified, and in this state the procedure then proceeds to Step s9.

In Step s9, the application program is executed. The application program is executed, for example, with the mouse double-clicking the icon on the desktop. After the application program is executed as above, the CPU 10 sends to the LCD controller 14 the signals of the determined result sent from the determining section 12 and the image information sent from the display adjusting section 13. Next, in Step s10, the LCD controller 14 supplies the liquid crystal panel 1 with the signals of the determined result and image information sent from the CPU 10 so that an image is displayed on the liquid crystal panel 1.

When the application program is executed as above, the image can be displayed at the desired display position designated by the input to the touch panel 2. In the display apparatus 100, the screen size is so large as 64 to 100 inches as already mentioned. In a presentation where a presenter looks at images displayed in the display apparatus having such a large screen, the capability of the display apparatus that an image can be displayed at a desired position will free the presenter from the need of moving oneself to change the display position of the image displayed on the wide screen, thus allowing for better controllability.

Figure 4D:
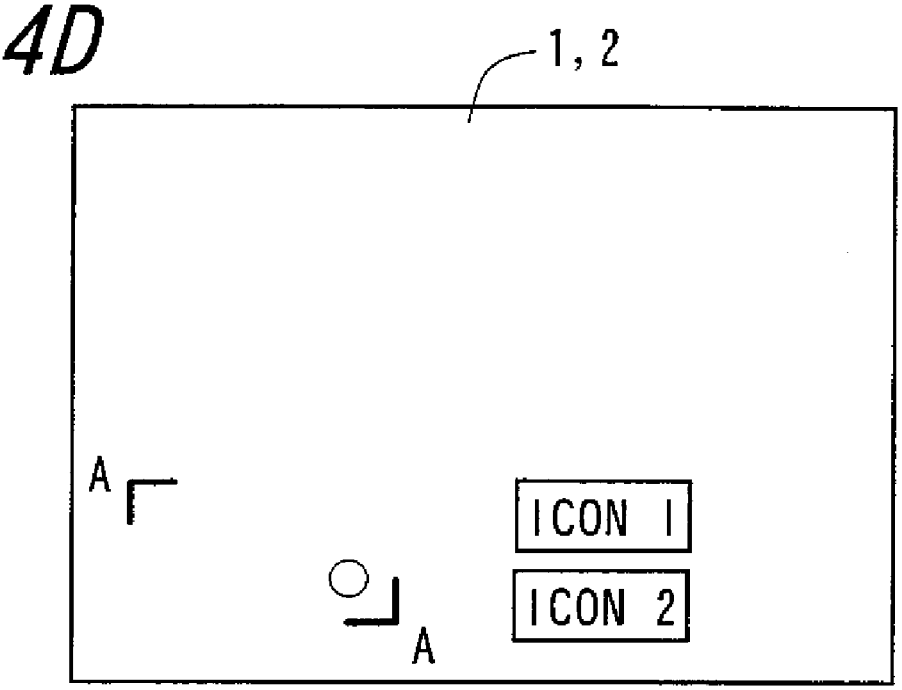
Figure 4E:
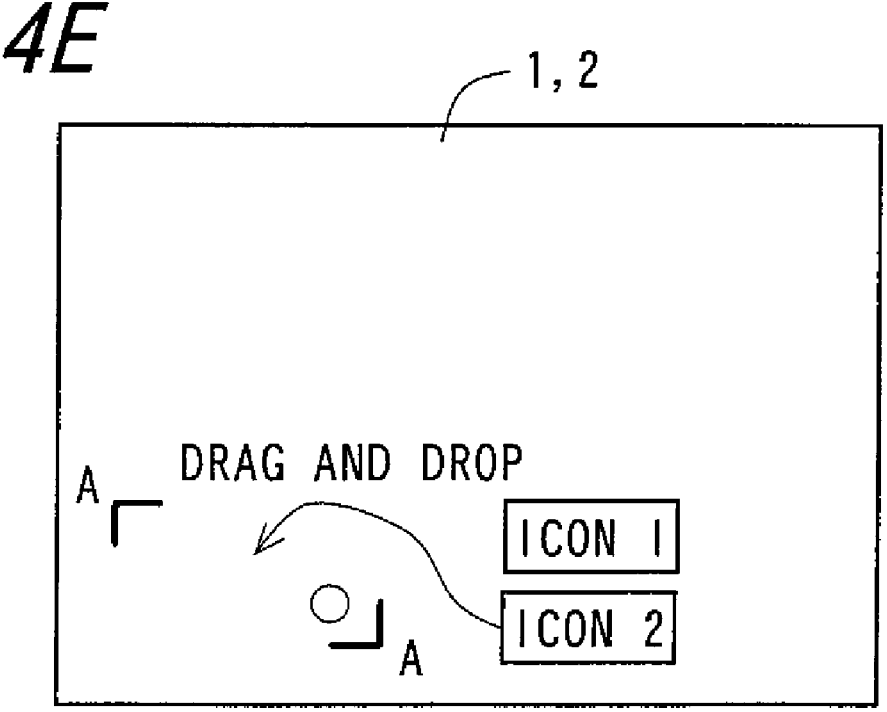

Even in the case of executing a plurality of application programs, images can be displayed at desired display positions by repeating the procedure from Step s1 to s10. For example, a circle (○) which is predetermined as the display position specifying mark is handwritten and thus inputted with use of the stylus to set the desired position within an area enclosed by the hook-shaped brackets A on the touch panel 2 as shown in FIG. 4D. After that, another icon arranged on the desktop as the application selecting mark is dragged and dropped within the area enclosed by the hook-shaped brackets A on the touch panel 2 by use of the mouse as shown in FIG. 4E so that the application program to be executed is specified.

Figure 6A:
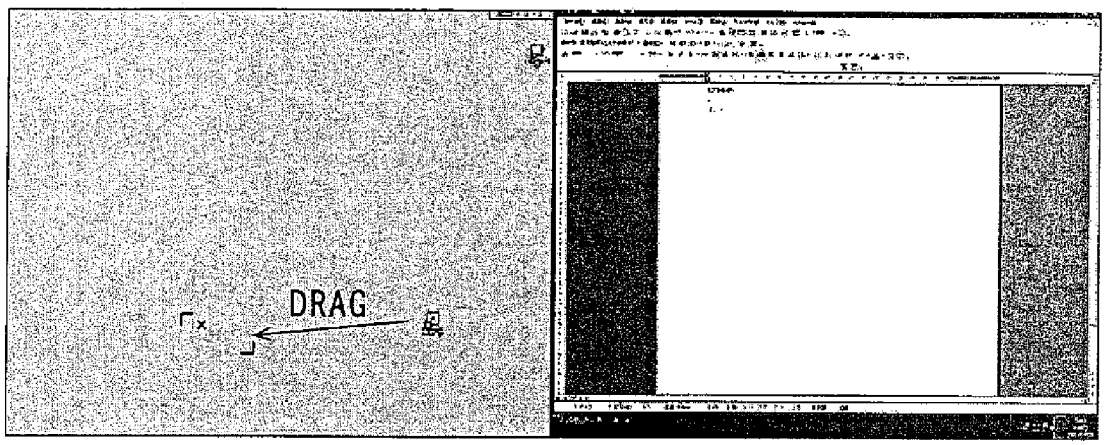
FIGS. 6A and 6B are views each showing an actual image displayed on the display apparatus by the display method according to the first embodiment of the invention.
Figure 6B:
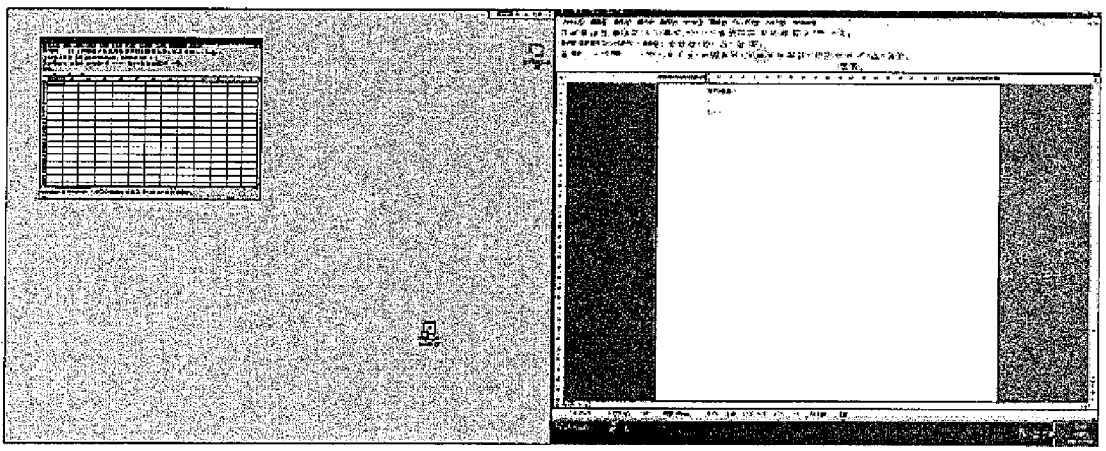

FIGS. 6A and 6B are views each showing an actual image displayed on the display apparatus 100 by the display method according to the first embodiment of the invention. FIGS. 6A and 6B each show the actual image displayed on the display apparatus 100 where a new window screen for "MICROSOFT EXCEL" is appearing at a desired display position in the display screen of the display apparatus 100 with a window screen for "MICROSOFT WORD" displayed.

As shown in FIG. 6A, a cross (x) which is predetermined as the display position specifying mark is handwritten and thus inputted with use of the stylus to set the desired position within an area enclosed by the hook-shaped brackets on the touch panel, and in this state, an icon "MICROSOFT EXCEL" arranged on the desktop as the application selecting mark is dragged and dropped within the area enclosed by the hook-shaped brackets on the touch panel by use of the mouse so that the application program to be executed is specified. Next, as shown in FIG. 6B, the icon on the desktop is double-clicked with the mouse to execute the application program, whereby the window screen for "MICROSOFT EXCEL" appears at the desired position.

Figure 7A:
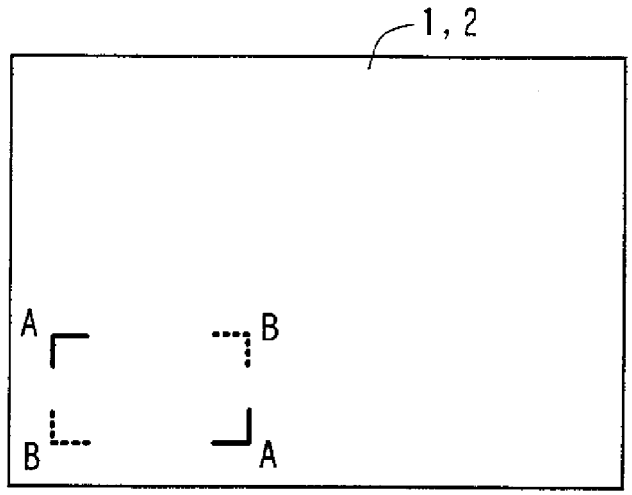
FIGS. 7A to 7C are views illustrating a display method according to a second embodiment of the invention, of displaying an image at a designated display position upon execution of an application program in the display apparatus.
Figure 7B:
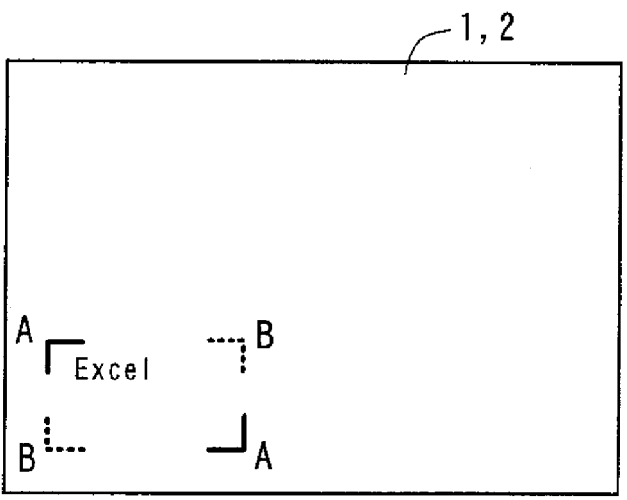
Figure 7C:
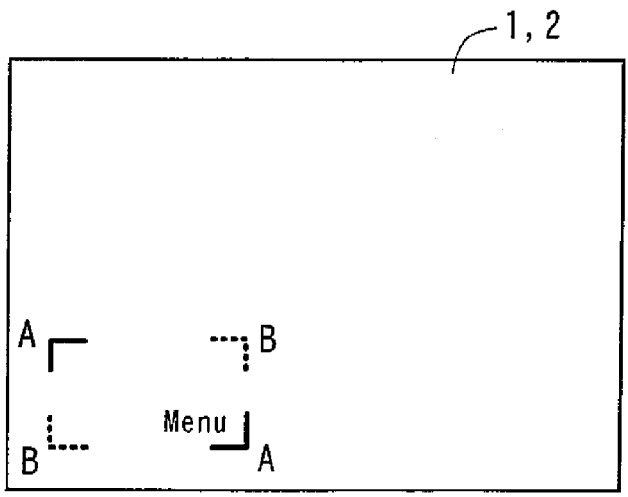

FIGS. 7A to 7C are views illustrating a display method according to a second embodiment of the invention, of displaying an image at a designated display position upon execution of an application program in the display apparatus 100. In the display method according to the second embodiment, the application program to be executed is determined by the determining section 12 and the display position is adjusted by the display adjusting section 13 when the predetermined marks indicative of the desired display position and application selection are inputted to the touch panel 2. The display method according to the second embodiment is the same as the display method according to the first embodiment, except the determination of the application program in the determining section 12 and the adjusting procedure of the display position of the image in the display adjusting section 13. There will be hereinbelow described the determination of the application program in the determining section 12 and the adjusting procedure of the display position of the image in the display adjusting section 13.

In the display method according to the second embodiment, the memory 15 stores the shape data of marks indicative of desired display position and application selection in association with respective application programs. For example, the character mark "Excel" serves as a mark for specifying the application program "MICROSOFT EXCEL" and indicating the display position of the window screen upon execution of "MICROSOFT EXCEL". The memory 15 also stores the shape data of mark having a pair of the hook-shaped brackets diagonally arranged, as the mark indicative of the full-screen size of the liquid crystal panel 1.

In the display method according to the second embodiment, the hook-shaped brackets A which are predetermined as the screen size mark, are firstly handwritten on the touch panel 2 by use of the stylus to specify the full-screen size as shown in FIG. 7A. Next, the character mark "Excel" is inputted by handwriting it at a desired display position, and the entry button is then pressed by use of the stylus as shown in FIG. 7B. This transmits the command signal indicative of the desired display position and application selection from the touch panel 2 to the CPU 10, and the CPU 10 sends the command signal received from the touch panel 2 to the recognizing section 11. The recognizing section 11 detects the command signal sent from the CPU 10. In the case where the recognizing section 11 recognizes that the command has a content indicative of the desired display position and application selection, the recognizing section 11 sends the recognized result to the CPU 10. Next, the display adjusting section 13 receives the command to adjust the display position from the CPU 10 and thus adjusts the display position, and the determining section 12 receives the command to determine an application program from the CPU 10 and thus determines an application program.

As described above, one mark input to the touch panel 2 allows the instructions on both selections of application program and display position. The command input operations can be thus simplified. In the case where a predetermined mark indicative of desired display position and application selection is inputted to the touch panel 2, the application program to be executed is preferably designed to be determined after the display adjusting section 13 adjusts and specifies the display position. Upon execution of the application program, the image can be therefore displayed at the desired display position unfailingly as compared to the case where the display position of the image is adjusted and specified after the application program is determined and specified.

Other than the application program, a menu window can also be displayed at a desired display position. The menu window herein indicates an auxiliary window for modifying brightness, a background color, and the like element of the screen of the display apparatus 100. In order to display such a menu window at a desired display position, the memory 15 stores shape data of a mark indicating display of the menu window. For example, the character mark "Menu" serves as a mark for indicating the display position of the menu window. By handwriting and thus inputting the character mark "Menu" at the desired display position as shown in FIG. 7C, the display adjusting section 13 adjusts the display position and the determining section 12 determines that the command indicates a menu window, with the result that the menu window can be displayed at the desired display position.

FIGS. 8A to 8E are views illustrating a display method according to a third embodiment of the invention, of displaying an image at a designated display position and in a designated display size upon execution of an application program in the display apparatus 100. FIG. 9 is a flowchart showing the display method according to the third embodiment of the invention. In the display method according to the third embodiment, the display adjusting section 13 adjusts the display position and the display size when one predetermined mark indicative of desired display position and display size is inputted to the touch panel 2.

In the display method according to the third embodiment, the operation for displaying an image at a desired position and in a desired display size is initiated upon execution of the application program in the display apparatus 100 controlled by the operating system "WINDOWS" (registered trademark). In this case, icons corresponding to the respective application programs stored in the HDD 16 are arranged as application selecting marks on the desktop. The memory 15 stores shape data of a pair of hook-shaped brackets diagonally arranged as a mark indicative of the full-screen size of the liquid crystal panel 1, and a square (□) and a circle (○) as display position and area specifying marks. As already mentioned, a size of the display position and area specifying mark itself serves as information indicative of the display size.

Figure 8A:
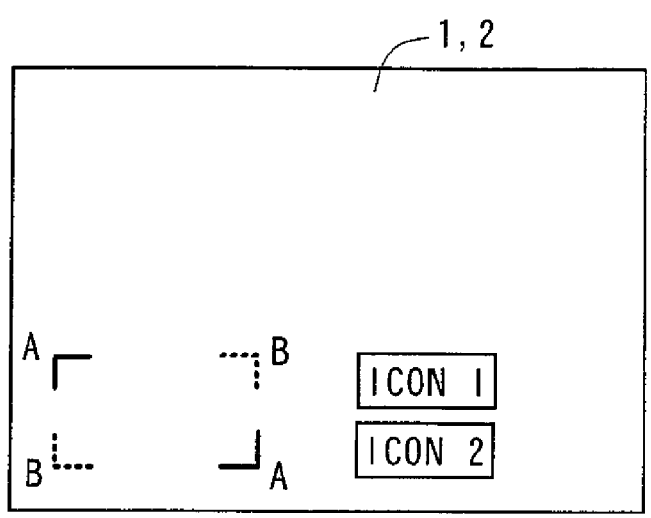
FIGS. 8A to 8E are views illustrating a display method according to a third embodiment of the invention, of displaying an image at a designated display position and in a designated display size upon execution of an application program in the display apparatus.

First of all, in Step a1, hook-shaped brackets A predetermined as a screen size mark are handwritten with use of the stylus and thus inputted to the touch panel 2 as shown in FIG. 8A. After completion of the handwriting input, an entry button (not shown) located on the touch panel 2 is pressed with use of the stylus to fix the command. This transmits the command signal from the touch panel 2 to the CPU 10, and the CPU 10 sends the command signal received from the touch panel 2 to the recognizing section 11.

Next, in Step a2, the recognizing section 11 detects the command signal sent from the CPU 10 and recognizes the content of the command through comparison with the shape data stored in the memory 15. In the case where the recognizing section 11 recognizes that the command has a content indicative of the full-screen size represented by the full-screen size mark, the recognizing section 11 sends the recognized result to the CPU 10. The procedure thus proceeds to Step a3. In the case where the recognizing section 11 fails to recognize the content of the command, a guidance window appears such as "PLEASE REENTER COMMAND" or the like message to encourage reentry of the command, When such a guidance window appears, Step a1 will be repeated. In this case, the handwriting input of the screen-size mark, i.e., the hook-shaped brackets A and B, to the touch panel 2 with use of the stylus makes it easy for the recognizing section 11 to recognize that the command indicates the full-screen size.

Figure 8B:
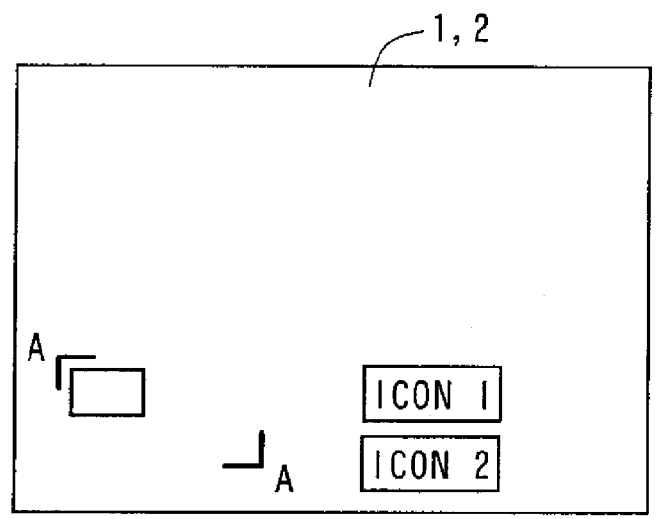

Next, in Step a3, a square (□) which is predetermined as the display position and area specifying mark is handwritten with use of the stylus and thus inputted within an area enclosed by the hook-shaped brackets A on the touch panel 2 as shown in FIG. 8B. After completion of the handwriting input, the entry button is pressed with use of the stylus. This transmits the command signal from the touch panel 2 to the CPU 10, and the CPU 10 sends the command signal received from the touch panel 2 to the recognizing section 11. Next, in Step a4, the recognizing section 11 detects the command signal sent from the CPU 10 and recognizes the content of the command through comparison with the shape data stored in the memory 15. In the case where the recognizing section 11 recognizes that the command has a content indicative of the display position and display size represented by the display position and area specifying mark, the recognizing section 11 sends the recognized result to the CPU 10. The procedure thus proceeds to Step a5. In the case where the recognizing section 11 fails to recognize the content of the command, a guidance window appears such as "PLEASE REENTER COMMAND" or the like message to encourage reentry of the command. When such a guidance window appears, Step a3 will be repeated.

Next, in Step a5, the display adjusting section 13 receives a command from the CPU 10 to adjust the display position and the display size based on the recognized result made by the recognizing section 11, and thus creates the image information including the display position and display size adjusted of the image to be displayed upon execution of the application program, thereafter sending the image information to the CPU 10. As described above, the display adjusting section 13 adjusts the display position and display size of the image when the predetermined display position and area specifying mark, i.e., the square (□), is inputted to the touch panel 2. The command for the display position and display size can be therefore distinguished from other commands, allowing for the display adjusting section 13 to reliably adjust the display position and display size of the image based on the command inputted to the touch panel 2.

Figure 8C:
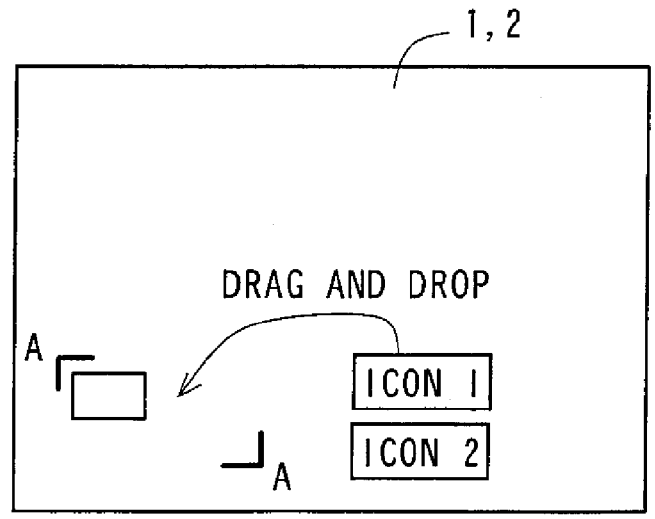

Next, in Step a6, an icon which is the application selecting mark located on the desktop is dragged and dropped within the area enclosed by the hook-shaped brackets A on the touch panel 2 by use of the operation member, i.e., the mouse, connected to the display apparatus 100, as shown in FIG. 8C. The drop causes the command signal to be sent to the CPU 10, and the CPU 10 sends the command signal to the recognizing Section 11. Next, in Step a7, the recognizing section 11 detects the command signal sent from the CPU 10 and recognizes the content of the command through comparison with the shape data stored in the memory 15. In the case where the recognizing section 11 recognizes that the command has a content indicative of the application determination represented by the application selecting mark, the recognizing section 11 sends the recognized result to the CPU 10. The procedure thus proceeds to Step a8. In the case where the recognizing section 11 fails to recognize the content of the command, a guidance window appears such as "PLEASE REENTER COMMAND" or the like message to encourage reentry of the command. When such a guidance window appears, Step a6 will be repeated.

Next, in Step a8, the determining section 12 receives the command sent from the CPU 10 to determine an application program based on the recognized result made by the recognizing section 11 and thereby specifies the application program to be executed, thereafter sending its determined result to the CPU 10. As described above, the application program to be executed, the display position, and the display size are specified, and in this state the procedure then proceeds to Step a9.

In Step a9, the application program is executed. The application program is executed, for example, with the mouse double-clicking the icon on the desktop. After the application program is executed as above, the CPU 10 sends to the LCD controller 14 the signals of the determined result sent from the determining section 12 and the image information sent from the display adjusting section 13. Next, in Step a10, the LCD controller 14 supplies the liquid crystal panel 1 with the signals of the determined result and image information sent from the CPU 10 so that an image is displayed on the liquid crystal panel 1.

When the application program is executed as described above, the image can be displayed at the desired display position and in the desired display size designated by the input to the touch panel 2. In the display apparatus 100, the screen size is so large as 64 to 100 inches as already mentioned. In a presentation where a presenter looks at images displayed in the display apparatus having such a large screen, the capability of the display apparatus that an image can be displayed at a desired position and in a desired size will free the presenter from the need of moving oneself to change the display position and display size of the image displayed on the wide screen, thus allowing for better controllability.

Figure 8D:
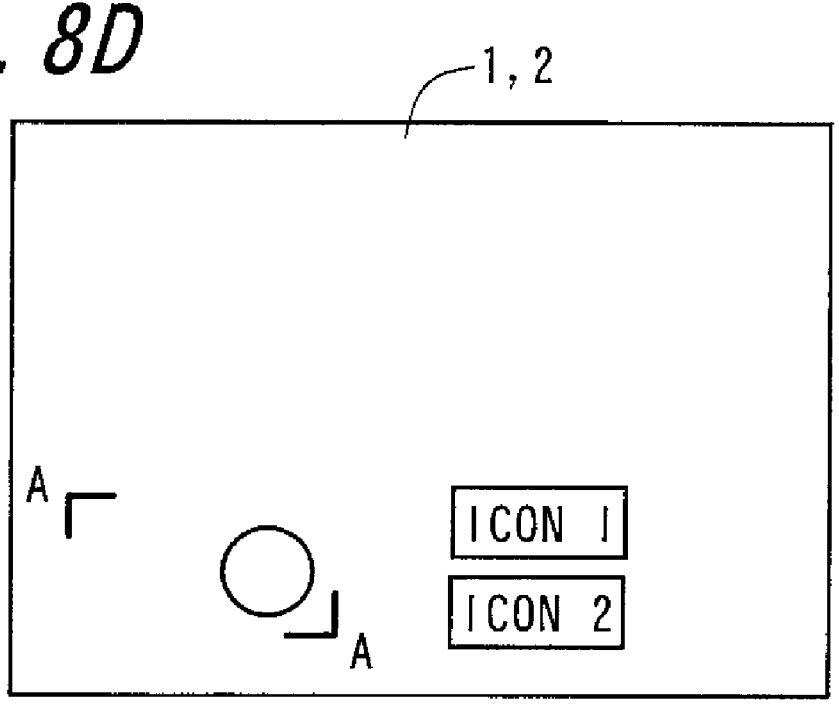
Figure 8E:
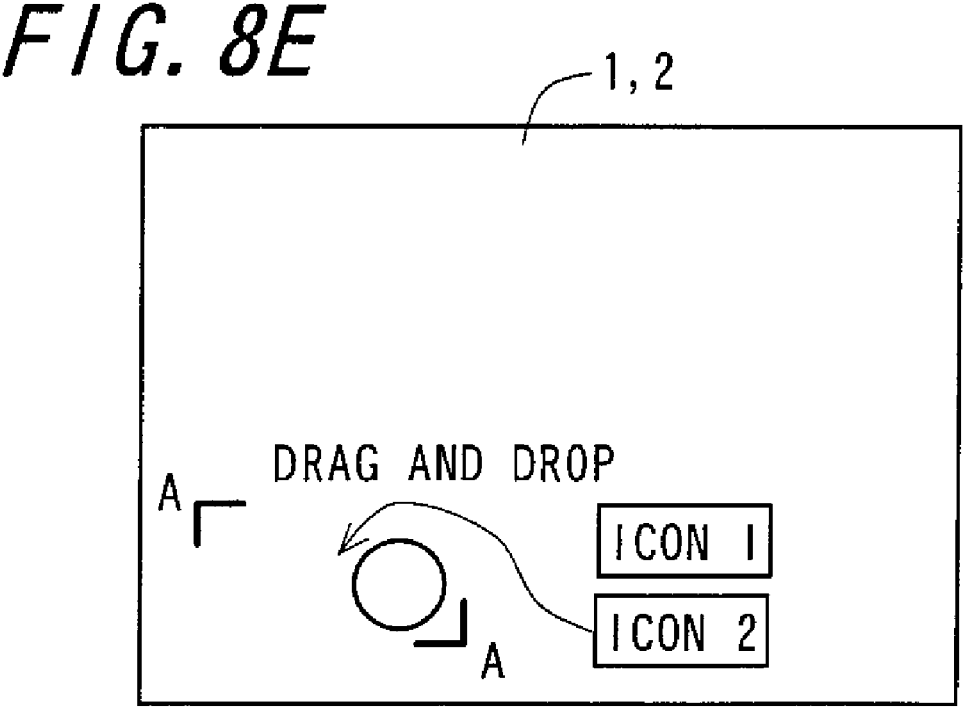

Even in the case of executing a plurality of application programs, images can be displayed at desired display positions and in desired display sizes by repeating the procedure from Step a1 to a10. For example, a circle (○) which is predetermined as the display position and area specifying mark is handwritten and thus inputted with use of the stylus to set the desired position and desired size within an area enclosed by the hook-shaped brackets A on the touch panel 2 as shown in FIG. 8D. After that, another icon arranged on the desktop as the application selecting mark is dragged and dropped within the area enclosed by the hook-shaped brackets A on the touch panel 2 by use of the mouse as shown in FIG. 8E so that the application program to be executed is specified.

Figure 10A:
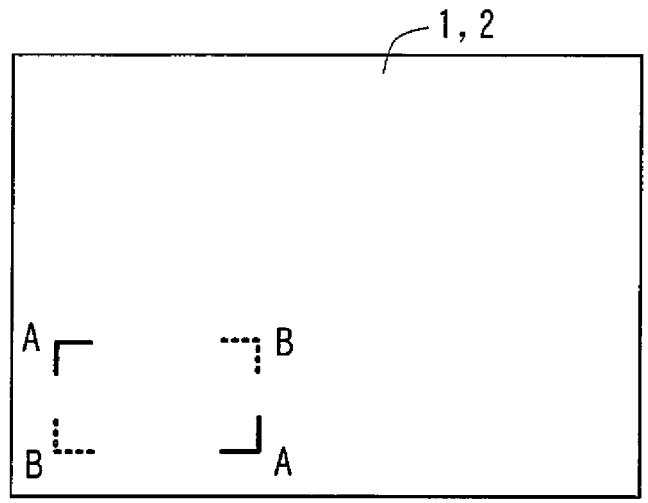
FIGS. 10A to 10C are views illustrating a display method according to a fourth embodiment of the invention, of displaying an image at a designated display position and in a designated display size upon execution of an application program in the display apparatus.
Figure 10B:
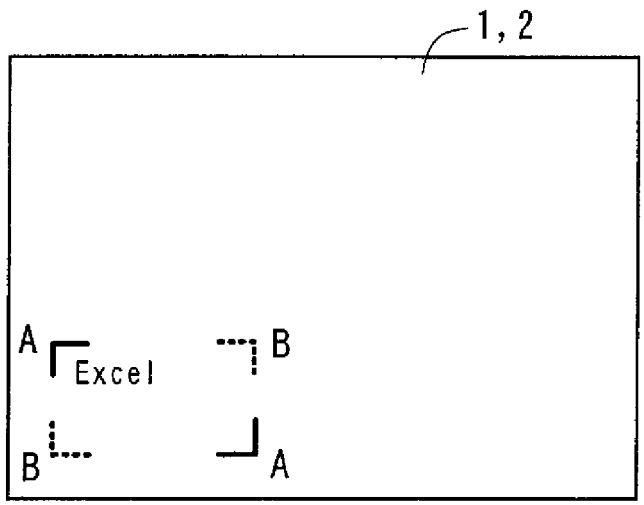
Figure 10C:
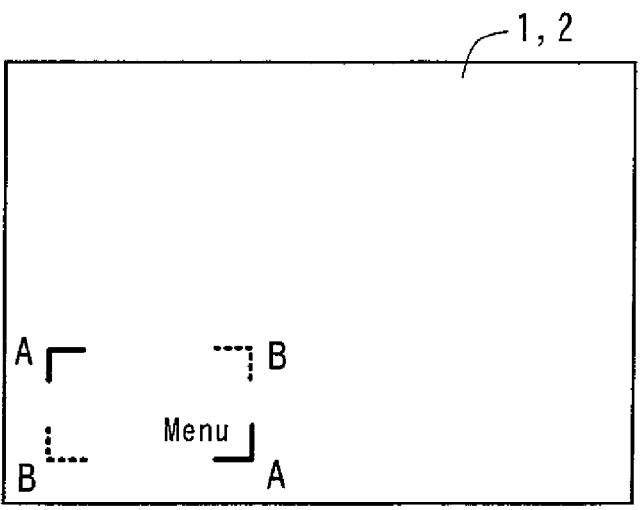

FIGS. 10A to 10C are views illustrating a display method according to a fourth embodiment of the invention, of displaying an image at a designated display position and in a designated display size upon execution of an application program in the display apparatus 100. In the display method according to the fourth embodiment, the application program to be executed is determined by the determining section 12 and the display position and display size are adjusted by the display adjusting section 13 when the predetermined marks indicative of the desired display position, display size, and application selection are inputted to the touch panel 2. The display method according to the fourth embodiment is the same as the display method according to the third embodiment, except the determination of the application program in the determining section 12 and the adjusting procedure of the display position and display size of the image in the display adjusting section 13. There will be hereinbelow described the determination of the application program in the determining section 12 and the adjusting procedure of the display position and display size of the image in the display adjusting section 13.

In the display method according to the fourth embodiment, the memory 15 stores the shape data of marks indicative of desired display position, display size, and application selection in association with respective application programs. For example, the character mark "Excel" serves as a mark for specifying the application program "MICROSOFT EXCEL" and indicating the display position and display size of the window screen upon execution of "MICROSOFT EXCEL". In this case, a size of the mark serves as information indicative of the display size. The memory 15 also stores the shape data of mark having a pair of the hook-shaped brackets diagonally arranged, as the mark indicative of the full-screen size of the liquid crystal panel 1.

In the display method according to the fourth embodiment, the hook-shaped brackets A which are predetermined as the screen size mark, are firstly handwritten on the touch panel 2 by use of the stylus to specify the full-screen size as shown in FIG. 10A. Next, the character mark "Excel" is inputted by handwriting it at a desired display position and in a desired display size, and the entry button is then pressed by use of the stylus as shown in FIG. 10B. This transmits the command signal indicative of the desired display position, display size, and application selection from the touch panel 2 to the CPU 10, and the CPU 10 sends the command signal received from the touch panel 2 to the recognizing section 11. The recognizing section 11 detects the command signal sent from the CPU 10. In the case where the recognizing section 11 recognizes that the command has a content indicative of the desired display position, display size, and application selection, the recognizing section 11 sends the recognized result to the CPU 10. Next, the display adjusting section 13 receives the command to adjust the display position and display size from the CPU 10 and thus adjusts the display position and display size, and the determining section 12 receives the command to determine an application program from the CPU 10 and thus determines an application program.

As described above, one mark input to the touch panel 2 allows the instructions on all selections of application program display position, and display size. The command input operations can be thus simplified. In the case where a predetermined mark indicative of desired display position, display size, and application selection is inputted to the touch panel 2, the application program to be executed is preferably designed to be determined after the display adjusting section 13 adjusts and specifies the display position and display size. Upon execution of the application program, the image can be therefore displayed at the desired display position unfailingly as compared to the case where the display position and display size of the image are adjusted and specified after the application program is determined and specified.

Other than the application program, a menu window can also be displayed at a desired display position and in a desired display size. In order to display such a menu window at a desired display position and in a display size, the memory 15 stores shape data of a mark indicative of the display position and display size of the menu window. For example, the character mark "Menu" serves as a mark for indicating the display position and display size of the menu window. In this case, a size of the mark serves as information indicative of the display size. By handwriting and thus inputting the character mark "Menu" at the desired display position and in the desired display size as shown in FIG. 10C, the display adjusting section 13 adjusts the display position and display size and the determining section 12 determines that the command indicates a menu window, with the result that the menu window can be displayed at the desired display position and in the desired display size.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A display apparatus comprising:
a storage section for storing application programs;
a display section for displaying an image;
a touch panel for inputting commands for setting of the image to be displayed on the display section;
a recognizing section for detecting the commands inputted to the touch panel and recognizing a content of each command based on a detected result, the commands including,
a screen size command for displaying a screen size mark, indicative of a full-screen size of the display section, to be displayed on the display section, a size of the screen size mark being smaller than a size of the display section,
a display position specifying command inputted within the screen size mark, a position of the display position specifying command within the screen size mark being indicative of a display position of an image of an application program within a full-screen size of the display portion, and
an application selecting command for selecting the application program to be displayed on the display portion;
a determining section for determining an application program to be executed among the application programs stored in the storage section based on the application selecting command recognized by the recognizing section;
a display adjusting section for creating image information by adjusting the display position of the image associated with the application program to be displayed on the display section based on the screen size command and the display position specifying command recognized by the recognizing section; and
a display controlling section for supplying to the display section the image information created by the display adjusting section, and displaying the image on the display section,
upon execution of the application program determined by the determining section, the image associated with the application program appearing at the display position on the display section at the position adjusted by of the display adjusting section.

2. The display apparatus of claim 1, wherein the display adjusting section adjusts the display position of the image associated with the application program on the display section according to a predetermined display position specifying mark indicative of desired display position, within the full-screen size of the display section, inputted to the touch panel.

3. The display apparatus of claim 1, wherein the determining section determines the application program to be executed according to an application selecting mark indicative of application selection commend inputted to the touch panel, the mark corresponding to each application program stored in the storage section.

4. The display apparatus of claim 1, wherein the determining section determines the application program to be executed and the display adjusting section adjusts the display position of the image on the display section, according to the application selecting command and a display position specifying mark indicative of desired display position inputted to the touch panel.

5. The display apparatus of claim 4, wherein the display adjusting section adjusts and specifies the display position of the image on the display section and then the determining section determines the application program to be executed, according to the display position specifying mark indicative of desired display position and the application selection command inputted to the touch panel.

6. A display apparatus comprising:
a storage section for storing application programs;
a display section for displaying an image;
a touch panel for inputting commands for setting of the image to be displayed on the display section;
a recognizing section for detecting the commands inputted to the touch panel and recognizing a content of each command based on a detected result, the commands including,
a screen size command for displaying a screen size mark, indicative of a full-screen size of the display section, to be displayed on the display section, a size of the screen size mark being smaller than a size of the display section,
a display position and display size specifying command inputted within the screen size mark, a position and a display size of the display position and display size specifying command within the screen size mark being indicative of a display position and a display size of an image of an application program within a full-screen size of the display portion, and
an application selecting command for selecting the application program to be displayed on the display portion;
a determining section for determining an application program to be executed among the application programs stored in the storage section based on the application selecting command recognized by the recognizing section;
a display adjusting section for creating image information by adjusting the display position and the display size of the image associated with the application program to be displayed on the display section based on the screen size command and the display position and display size specifying command recognized by the recognizing section; and
a display controlling section for supplying to the display section the image information created by the display adjusting section, and displaying the image on the displaying section,
upon execution of the application program determined by the determining section, the image associated with the application program appearing at the display position and in the display size adjusted by the display adjusting section.

7. The display apparatus of claim 6, wherein the display adjusting section adjusts the display position and display size of the image associated with the application program on the display section according to a predetermined display position and area specifying mark indicative of desired display position, within the full-screen size of the display section, and display size inputted to the touch panel.

8. The display apparatus of claim 6, wherein the determining section determines the application program to be executed according to an application selecting mark indicative of application selection command inputted to the touch panel, the mark corresponding to each application program stored in the storage section.

9. The display apparatus of claim 6, wherein the determining section determines the application program to be executed and the display adjusting section adjusts the display position and display size of the image on the display section, according to the application selecting command and a display position and display size specifying mark indicative of desired display position, display size inputted to the touch panel.

10. The display apparatus of claim 9, wherein the display adjusting section adjusts and specifies the display position and display size of the image on the display section and then the determining section determines the application program to be executed, according to the display position and display size specifying mark indicative of desired display position, display size, and the application selection command inputted to the touch panel.

11. A display method comprising:
a command input step of inputting commands for setting of an image to be displayed on a display apparatus;
a recognizing step of detecting the commands inputted in the command input step and recognizing a content of each command based on a detected result, the commands including,
 a screen size command for displaying a screen size mark, indicative of a full-screen size of the display section, to be displayed on the display section, a size of the screen size mark being smaller than a size of the display section,
 a display position specifying command inputted within the screen size mark, a position of the display position specifying command within the screen size mark being indicative of a display position of an image of an application program within a full-screen size of the display portion, and
 an application selecting command for selecting the application program to be displayed on the display portion;
a display adjusting step of creating image information by adjusting the display position of the image associated with the application program to be displayed on the display apparatus based on the screen size command and the display position specifying command recognized in the recognizing step;
a determining step of determining an application program to be executed based on the application selecting command recognized in the recognizing step; and
a displaying step of detecting the image information created in the display adjusting step and displaying the image on the display apparatus,
upon execution of the application program determined in the determining step, the image associated with the application program appearing at the display position at the position adjusted in the display adjusting step.

12. A display method comprising:
a command input step of inputting commands for setting of an image to be displayed on a display apparatus;
a recognizing step of detecting the commands inputted in the command input step and recognizing a content of each command based on a detected result, the commands including,
 a screen size command for displaying a screen size mark, indicative of a full-screen size of the display section, to be displayed on the display section, a size of the screen size mark being smaller than a size of the display section,
 a display position and display size specifying command inputted within the screen size mark, a position and a display size of the display position and display size specifying command within the screen size mark being indicative of a display position and a display size of an image of an application program within a full-screen size of the display portion, and
 an application selecting command for selecting the application program to be displayed on the display portion;
a display adjusting step of creating image information by adjusting the display position and the display size of the image associated with the application program to be displayed on the display apparatus based on the screen size command and the display position and display size specifying commend recognized in the recognizing step;
a determining step of determining an application program to be executed based on the application selecting command recognized in the recognizing step; and
a displaying step of detecting the image information created in the display adjusting step and displaying the image on the display apparatus,
upon execution of the application program determined in the determining step, the image associated with the application program appearing at the display position and in the display size adjusted by the display adjusting step.

* * * * *